(12) United States Patent
Cunigan

(10) Patent No.: US 9,452,306 B1
(45) Date of Patent: Sep. 27, 2016

(54) COMPOSITION AND METHOD FOR REMEDIATION OF HEAVY METAL CONTAMINATED SURFACES AND SOILS

(71) Applicant: Robert Cunigan, Louisville, KY (US)

(72) Inventor: Robert Cunigan, Louisville, KY (US)

(*) Notice: Subject to any disclaimer, the term of this patent is extended or adjusted under 35 U.S.C. 154(b) by 202 days.

(21) Appl. No.: 14/517,886

(22) Filed: Oct. 19, 2014

Related U.S. Application Data

(63) Continuation-in-part of application No. 12/927,368, filed on Nov. 12, 2010, now abandoned.

(60) Provisional application No. 61/893,826, filed on Oct. 21, 2013, provisional application No. 61/284,367, filed on Dec. 17, 2009, provisional application No. 61/218,118, filed on Nov. 13, 2009.

(51) Int. Cl.
*A62D 3/33* (2007.01)

(52) U.S. Cl.
CPC ..................... *A62D 3/33* (2013.01)

(58) Field of Classification Search
None
See application file for complete search history.

(56) References Cited

U.S. PATENT DOCUMENTS 8,163,100 B2 * 4/2012 Karagianni ......... C08F 293/005
134/25.2

* cited by examiner

*Primary Examiner* — Necholus Ogden, Jr.
(74) *Attorney, Agent, or Firm* — Law Office of J L Simunic; Joan L. Simunic

(57) ABSTRACT

The present invention relates to a composition and method for remediation of heavy metal contaminated substances. More particularly, the present invention relates to a composition and method for remediating soil, paint chips, paint dusts, surfaces, and other substances contaminated with heavy metals by application of an aqueous suspension of phosphate compound. Even more particularly, the present invention relates to remediating soil, paint chips, paint dusts, surfaces, and other substances contaminated with lead by at least one application of an aqueous suspension of tricalcium phosphate, surfactant, hydrophobically-modified hydroxyethylcellulose, and a chloride source.

19 Claims, No Drawings

COMPOSITION AND METHOD FOR REMEDIATION OF HEAVY METAL CONTAMINATED SURFACES AND SOILS

CROSS-REFERENCE TO PRIOR APPLICATIONS

The present application claims priority to U.S. Provisional Patent Application 61/218,118 filed Nov. 13, 2009, and to U.S. Provisional Patent Application 61/284,367 filed Dec. 17, 2009, and to U.S. patent application Ser. No. 12/927,368 filed Nov. 12, 2010, and to U.S. Provisional Patent Application 61/893,826 filed Oct. 21, 2013, each of which is incorporated by reference in its entirety.

FIELD OF THE INVENTION

The present invention relates to a composition for remediation of heavy metal contaminated surfaces, and a method of using the composition. More particularly, the present invention relates to a composition comprising an aqueous suspension of a di-calcium or tri-calcium phosphate compound, a chloride source, hydrophobically-modified hydroxyethylcellulose, and a surfactant. The composition is applied to a surface contaminated with heavy metals, such as lead, by brushing or spraying the composition on the surface.

BACKGROUND OF THE INVENTION

The danger of exposure to elevated levels of heavy metals, such as lead, in paint dust, contaminated soil, groundwater and water supplies, has been the subject of interest and global regulation for some time. Many developed countries have established regulatory limits to control the leaching of these inorganic contaminants into landfills or open environments where these wastes are disposed or reused. Heavy metal contamination may also occur at residential or commercial properties due to the original use of heavy-metal containing construction materials, such as lead-based paints, which flake or deteriorate to dust upon aging. Despite regulatory efforts, many sites of heavy metal contamination may be found in the United States and around the world.

Current Environmental Protection Agency (EPA) Renovation, Repair and Painting (RRP) rules recommend that dusts be minimized using wet scrape or wet sanding techniques. Using these techniques surfaces are wetted with water, then wetted dusts fall to the floor where they may be tracked around the work site or outside the work site. When the lead-based dusts become dry, they again become an inhalation hazard. Further, the water used to wet the dust and debris may suspend lead-based dust or paint chips containing lead and may become a source of contamination itself.

Efforts have been made to remediate heavy metals that leach into soil. For example, U.S. Pat. No. 5,162,600 teaches a process of contacting a phosphate-containing agent or a phosphite-containing agent with soil containing mobile lead. The lead reacts with the phosphate-containing or phosphite-containing agent to form immobilized, water-insoluble lead compounds. The '600 patent teaches loading the agent into the soil by spreading the composition over the surface of the contaminated site. Optionally, the agent may be plowed or disked into the soil to effect mixing.

The process of the '600 patent provides a method for reducing leachable lead in soil, but is expensive, time-consuming, labor-intensive, and may be impractical near trees, shrubby, flower beds, or buildings. In addition, the reactivity of phosphate-containing or phosphite-containing agents is related to the surface area of the agents. Certain phosphate compounds naturally form large agglomerates, which decreases the surface area of the compounds. Consequently, relatively large amounts of agglomerated phosphate-containing or phosphite-containing agents are needed for soil remediation.

The EPA has historically recommended measuring lead levels of painted surfaces using toxicity characteristic leaching procedure (TCLP) methods. Unfortunately, these methods are more suitable for measuring heavy metals of hazardous wastes going into landfills than for measuring levels in painted surfaces or in soils. Thus, these methods do not reflect the potential hazard from paint dusts and paint chips or in soils that may potentially be ingested, such as those heavy-metal contaminated sources found around homes, daycares or schools where children typically play. Recently, the EPA has started to use an in vitro bioaccessibility assay described in EPA 9200.1-86 November 2008 modified to pH 2.5 for a more accurate assessment of human risk from heavy metal presence.

The present invention provides a composition which, according to the new standards, renders a remediated surface or soil with substantially lower bioavailable lead than can be achieved from using prior art compositions. The composition is easy to apply to painted surfaces and soils, even when shrubbery and other plantings are present.

SUMMARY OF THE PRESENT INVENTION

The present development is a composition for remediating soil, paint chips, paint dusts, surfaces, and other substances contaminated with heavy metals. The composition comprises a water-insoluble phosphate compound, a chloride source, at least one surfactant, and hydrophobically-modified hydroxyethylcellulose suspended in an aqueous solution. In a preferred embodiment, the water-insoluble phosphate compound is a calcium phosphate, more preferably tricalcium phosphate. The composition may further comprise other thixotropic agents, a preservative, a defoamer, and a dispersant.

The present development is also a method for using an aqueous suspension comprising a water-insoluble phosphate compound, a chloride source, at least one surfactant, and hydrophobically-modified hydroxyethylcellulose for remediation of heavy-metal contamination.

DETAILED DESCRIPTION OF THE PRESENT DEVELOPMENT

The present invention relates to a composition and method for remediating soil, paint chips, paint dusts, surfaces, and other substances contaminated with heavy metals by application of an aqueous suspension comprising a water-insoluble phosphate compound, a chloride source, at least one surfactant, and hydrophobically-modified hydroxyethylcellulose. Optionally, the composition may include one or a combination of resins, opacifiers, coalescing agents, preservatives, defoamers, dispersants, additional thixotropes, and surfactants.

The composition is applied to a surface or soil contaminated with heavy metals, such as lead. For example, the composition may be delivered as a primer which can be applied to contaminated surfaces by brush application or by paint roller application. Contaminated surfaces are frequently painted surfaces. As used herein, "painted surfaces"

refers to interior and exterior painted surfaces, including but not limited to wood, plastic, fiberglass, metal, and masonry. The composition of the present invention reacts with heavy metal which is present on the surface to form a non-toxic water insoluble compound. The composition may be used for, among other uses, remediation of chips, flecks, and dust from lead-based paint and other lead-contaminated surfaces associated with building renovation, repair, and painting.

Alternatively, the composition may be delivered as a neutralizer or soil treatment that can be sprayed onto the contaminated surface. Because the phosphate in the composition sequesters the heavy metal contaminant, it is not necessary to remove the composition from the treatment site.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "a surfactant" includes a plurality of such surfactants, and so forth, unless expressly limited herein.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

The present invention is a composition comprising an aqueous suspension of a phosphate compound, a chloride source, at least one surfactant, and hydrophobically-modified hydroxyethylcellulose. Optionally, the composition may include one or a combination of resins, opacifiers, coalescing agents, preservatives, defoamers, dispersants, additional thixotropes, and surfactants, and binders.

The phosphate compound may be any substantially water-insoluble phosphate-based compound that can react with lead to form a low-solubility or insoluble reaction compound. Preferably, the phosphate compound exhibits nominal agglomeration, if any, so the phosphate compound will retain an extremely fine particle size. The smaller the particle size the greater the available surface area so the greater the reaction efficiency compared to phosphates that agglomerate into relatively large particles.

In the composition, the phosphate compound is present at a concentration of from about 10 wt % to about 30 wt %. In a preferred embodiment, the phosphate compound is selected from dicalcium phosphate ("DCP"), tricalcium phosphate ("TCP", $Ca_3(PO_4)_2$), hydroxyapatite ($Ca_{10}(PO_4)_6(OH)_2$), DCP dihydrate ("DCP-DH") or a combination thereof. The phosphate compound is preferably in powdered form and has a diameter up to 0.01 inches. In a more preferred embodiment, the phosphate compound is tricalcium phosphate in powdered form and having a diameter not greater than 0.001 inches. In a most preferred embodiment, the phosphate compound is tricalcium phosphate in powdered form and having a diameter not greater than 0.001 inches, and having a concentration of 10+/−2 wt % of the composition when used as a spray neutralizer, or 20+/−2 wt % when used as a primer, or 30+/−2 wt % when used for soil treatment.

The chloride source may be sodium chloride, calcium chloride, magnesium chloride, iron chloride or other soluble chloride. Preferably the chloride source is sodium chloride present at a concentration of from about 0.7 wt % to about 1.5 wt %.

The surfactant may be any material or combination of materials that stabilize the dispersion and increase the composition's shelf life. An exemplary surfactant for the composition of the present invention is a phosphate ester salt. As is known in the art, two or more surfactants may be used in combination, particularly when either one alone would not be effective at stabilizing the dispersion. For example, an exemplary combination is the ethoxylated nonylphenol Superwet™ 5 provided by Superior Oil Company, Inc. combined with the phosphate ester salt Strodex® PK-95G provided by Hercules Inc. wherein each surfactant is present at a concentration of from about 0.1 wt % to about 0.5 wt %.

Thixotropes are used to provide the composition of the present invention with a rest viscosity value between 60 and 110 Krebs units, and preferably at 100+/−5 Krebs units. Hydrophobically-modified hydroxyethylcellulose (HMHEC) is a thixotropic agent comprising a nonionic polymer produced through a cetyl substitution reaction of hydroxyethylcellulose. This provides hydrophobic end groups on the hydroxyethylcellulose. Methods for preparation of HMHEC polymers and use of the HMHEC polymers in aqueous solutions are known in the art, such as taught in U.S. Pat. No. 4,228,277, U.S. Pat. No. 4,298,728, and U.S. Pat. No. 4,684,704, each of which is incorporated in its entirety. HMHEC polymers are unique in that they function as associative thickeners, meaning they not only thicken aqueous systems via chain entanglement and conventional hydrogen bonding, but also via hydrophobe interactions. In a preferred embodiment the HMHEC of the present invention is a nonionic polymer produced through a cetyl substitution reaction of hydroxyethylcellulose with a $C_{10}$ to $C_{24}$ alkyl group. Exemplary sources of HMHEC include CELLO-SIZE® HM HEC 500 from Dow Chemical Company and the NATROSOL™ 330 PLUS from Ashland-Aqualon. Preferably the HMHEC is present at a concentration of from about 0.2 wt % to about 0.9 wt % of the composition.

Optionally, additional thixotropes may be included in the composition to achieve a desired viscosity and excellent spray atomization properties. Exemplary thixotropes include non-ionic thixotropes, methyl oxirane polymer, colloidal aluminum silicate, kaolinite clay, bentonite clay, attapulgite clay, and associative thickeners. Associative thickeners are known in the art and operate to thicken aqueous systems to which they are added by non-specific associations, such as adsorption on dispersed phase surfaces and aggregation in solution between the hydrophobic groups on the thickener molecules and moieties on the other components in the system. Because associative thickeners comprise at least two hydrophobic groups, a network of associations is established. This network increases the viscosity of the aqueous compositions. Associative thickeners comprise hydrophobic alkali-soluble emulsions ("HASE thickeners"), such as Rheolate™ 450 provided by Elementis Specialties, and hydrophobically-modified polyethylene oxide urethane ("HUER thickeners"), such as ACRYSOL™ RM-825 provided by Rohm and Haas or the methyl oxirane polymer Optiflo® H3300VF provided by Southern Clay Products, Inc. An exemplary thixotrope combination includes colloidal aluminum silicate, such as Optigel® WH by Southern Clay Products, Inc., hydrophobically-modified hydroxyethyl cellulose, such as CELLOSIZE® HMHEC 500 from Dow Chemical Company, and methyl oxirane polymer, such as Optiflo® H3300VF from Southern Clay Products, Inc. Preferably the total thixotrope concentration ranges from about 0.2 wt % to about 10 wt % of the composition.

As is known in the art, the surfactants and the thixotropes may be combined in a mixture specifically formulated to disperse and suspend the phosphate compound. Dispersion of the phosphate assists with preventing agglomeration to maintain the phosphate as fine particles, and can lengthen the shelf life of the resulting composition.

Optionally, the composition may include one or a combination of opacifiers, coalescing agents, preservatives, defoamers, dispersants, and resins or binders.

An opacifier is any additive that renders the composition opaque after application. Exemplary opacifiers include titanium dioxide or a mixture of titanium dioxide and hydrous kaolin clay, such as TIOXIDE® TR93 pigment from Huntsman combined with Thermoglace H from Burgess Pigment Company.

The coalescing agents are used to facilitate the curing of the primer. The present invention uses a non-volatile organic compound coalescing agent, such as a fatty acid ester. One particularly effective coalescing agent is Dapro FX 513 provided by Elementis.

One or more preservatives may be added to prevent microbial growth in the composition. An exemplary preservative is Nuosept® 44 from International Specialty Products, Inc., which uses the active ingredient sodium hydroxymethylglycinate. The concentration of the preservative will vary depending on the preservative selected.

The defoamer should be effective at preventing foam formation during dispersion. Preferably, the defoamer will be environmentally friendly and contain no volatile organic compounds. Defoamers are well-known in the art. For the present composition, without limitation, one example of a suitable defoamer is the paraffinic distillate defoamer DEE FO 3010A provided by Munzing Corporation. The defoamer should be included at a level between 0.2 wt % and 1.0 wt % of the composition, preferably about 0.6% by weight, with the level varying depending on the specific defoamer used.

The dispersant may be any anionic, non-ionic or cationic material that can effectively disperse the phosphate compound. An example of a suitable dispersant is the polycarboxylate Tamol® 1254 provided by Rohm and Haas Company. Other effective dispersants or combinations of dispersants may be recognized by a person skilled in the art. The dispersant should be included at a concentration relative to the concentration of phosphate compound. For example, between 5 to 10 parts of polycarboxylate should be used per 100 parts of TCP. The specific relative ratio will be dependent on the dispersant—phosphate compound selection.

The resin or binder preferably will react in a low pH environment to release the active ingredients and to prevent the spread of paint dust. In general terms, the binder provides an adhesive quality which causes heavy-metal containing dust debris to form aggregates which loosely attach to the disposable floor coverings, such as tarpaulins. This adhesive quality is comparatively weak, and debris can be later removed from the floor coverings by spraying with water. Any commonly used binder known for use in paint products may be used. Preferably, the binder should be environmentally friendly, should contain no volatile organic compounds, and should be able to break down in a low pH environment. An exemplary binder is Resyn 7480 from Celanese Company. Preferably the binder concentration ranges from about 0.9 wt % to about 2.0 wt % of the composition.

The composition of the present invention is preferably applied to surfaces that have previously been painted or coated with a heavy-metal containing paint. Alternatively, the composition may be applied to contaminated soil using multiple applications that will allow the active phosphate ingredient to percolate into the soil over time and providing access to heavy metals previously immobilized in clay. More specifically, the method for remediation of soil containing leachable or bioavailable lead comprises the steps of (a) applying to the soil the composition comprising a phosphate compound, at least one surfactant, a chloride source, and hydrophobically-modified hydroxyethylcellulose, (b) waiting a predetermined period of time, (c) testing the soil for leachable or bioavailable lead, and (d) applying additional composition to the soil if leachable or bioavailable lead is detected.

The following are representative examples of compositions made according to the present invention. These examples are presented to further explain the invention and are not intended, or to be taken, to limit the scope of the invention. For the purpose of this writing, any reference to "ambient temperature" refers to surrounding air temperatures of about 50° F. to about 110° F.

The compositions in Table 1 are prepared by adding while mixing to about three-quarters of the total water required the sodium hydroxymethylglycinate, about one-third of the paraffinic distillates, the polycarboxylate, the colloidal aluminum silicate, and the hydrophobically modified hydroxyethylcellulose. These materials are mixed until homogenized. Using a dispersion blade, the tricalcium phosphate and opacifiers, titanium dioxide and hydrous kaolin clay, are added to the thixotrope mixture and the mixture is mixed until the agglomerates are broken down to a particle size of less than 0.01 inches as determined by a grind with a fineness of greater than 4 NS as measured on Hegman Grind Gauge. To this dispersion is added the fatty acid ester, another one-third of the paraffinic distillates, the chloride source, the ethoxylated nonylphenol, the phosphate ester salt, methyl oxirane polymer, vinyl acetate resin and the remaining water. The viscosity is adjusted to by adding additional thixotrope as needed. Target viscosity for the surface spray, Example A, is from about 70 to about 75 Krebs units; target viscosity for the soil treatment, Example B, is about 65+/−5 Krebs units; target viscosity for the primer is about 100+/−5 Krebs units. The mixture is transferred to a mixing vessel and the remaining paraffinic distillates and colorant is added, and the mixture is mixed until any entrained air is removed. During the mixing process, the pH of the solution should be maintained between about 8.5 and 10.0. If necessary to adjust the pH, a non-VOC alkyl alkanolamine, such as Vantex T from Taminco, may be added to the composition.

| Component | Example A | Example B | Example C |
|---|---|---|---|
| Calcium chloride | 0.85% | — | — |
| Sodium chloride | — | 0.01% | 0.55% |
| Sodium hydroxy-methylglycinate | 0.22 | 0.21 | 0.18 |
| Paraffinic distillates | 0.66 | 0.62 | 0.54 |
| Polycarboxylate | 1.10 | 1.90 | 1.64 |
| Colloidal aluminum silicate | 0.44 | 0.62 | 0.36 |
| Hydrophobically modified hydroxy-ethylcellulose | 0.44 | 0.21 | 0.18 |
| Tricalcium phosphate | 10.98 | 20.72 | 17.90 |
| Titanium dioxide | — | — | 13.42 |
| Hydrous kaolin clay | — | — | 2,24 |
| Fatty acid ester | — | — | 0.89 |
| Resin | — | — | 20.13 |
| Ethoxylated nonylphenol | 0.22 | 0.21 | 0.22 |
| Phosphate ester salt | 0.22 | 0.21 | 0.22 |
| Methyl oxirane polymer | 5.27 | 0.21 | 0.45 |
| Vinyl acetate resin | 0.99 | — | — |
| Tinting black | — | — | 0.13 |
| Water | To balance | To balance | To balance |

As compared to the prior art, the composition of the present invention is a viscosity stable dispersion that holds the active ingredient in suspension to provide a shelf life of over three years. If properly prepared, the aqueous solution can delivery up to about 3 pounds of active ingredient per gallon of solution.

Example A is intended to be used in spray form and applied directly to a surface having heavy-metal contamination. The composition of Example A was tested in accordance with EPA "Test Methods for Evaluating Solid Waste, Physical/Chemical Methods," also known as SW-846, Toxicity Characteristic Leaching Procedure ("TCLP") Method 1311. Under this test, a hazardous level of lead is defined as greater than or equal to 5.0 mg/L leach lead. A 1.0 g sample of lead-based paint dust evaluated at 82-83 mg/L leachable lead was treated with 62.5 g of the composition of Example A. After treatment, the paint dust leachable lead is 1.1 mg/L.

Example B is intended to be used in spray form and applied directly to soil having heavy-metal contamination. Example B was tested in accordance with EPA SW-846 TCLP Method 1311, wherein a hazardous level of lead is defined as greater than or equal to 5.0 mg/L leach lead. A sample of soil containing 320 mg/L leachable lead is treated with the composition of Example B in a ratio of 8 parts soil per 1 part Example B composition, and the leachable lead is reduced to 120 mg/L. A sample of soil containing 320 mg/L leachable lead is treated with the composition of Example B in a ratio of 4 parts soil per 1 part Example B composition, and the leachable lead is reduced to 40 mg/L.

The composition of Example C was evaluated using the in vitro bioaccessibility assay described in EPA 9200.1-86 November 2008, which provides a rapid and relatively inexpensive alternative to in vivo assays for predicting relative bioavailability, (RBA) of lead in soils and soil-like materials. The method is based on the concept that lead solubilization in gastrointestinal fluid is likely to be an important determinant of lead bioavailability in vivo. The method measures the extent of lead solubilization in an extraction solvent that resembles gastric fluid. The fraction of lead which solubilizes in an in vitro system is referred to as in vitro bioaccessibility (IVBA), which may then be used as an indicator of in vivo RBA. This current test was modified to use a pH of 2.5 which gives a better correlation to in vivo tests.

A first sample contained paint chips having a 42% bioaccessible lead level. The sample was treated with the composition of Example C and then found to have a 5.89% bioaccessible lead level, or a 86% reduction in bioaccessible lead level. A second sample contained paint chips having a 52.8% bioaccessible lead level. The sample was treated with the composition of Example C and then found to have a 9.23% bioaccessible lead level, or a 82.5% reduction in bioaccessible lead level.

The compositions of Examples A-C may easily be applied using common techniques for applying liquid, such as, for example, using a hand held trigger sprayer, a pressurized pump sprayer, a garden hose sprayer, or an airless sprayer. The composition of Example A may be wiped off surfaces, tools, barriers, footwear, and other substances using a damp rag or cloth and safely disposed of in normal household trash. For larger applications, paint surface may be wet scraped or wet sanded and resulting nonhazardous debris can be disposed of according to local laws. It is not necessary or recommended to remove the compositions of Examples B or C after application. Unlike misting with water, the compositions of Examples A-C will typically remain wet for 3-6 hours depending on temperature and humidity. The composition, when no shear stress is applied, is significantly more viscous than water and will remain on vertical surfaces for a corresponding longer period of time than will water. This property provides workers with a longer period of time to wet scrape or wet sand walls before additional solution need be applied, increasing worker efficiency as compared to wet scraping or wet sanding with water. Multiple applications may be applied to the same site if necessary to effect maximum heavy-metal remediation.

In a preferred embodiment, the composition includes only ingredients with zero volatile organic compounds, making this a more environmentally friendly treatment. By utilizing insoluble TCP as the active ingredient, the potential for ground water contamination from soluble phosphates is reduced to almost zero.

The composition of the present invention may be easily applied using common techniques for applying liquid to painted surfaces, such as, for example a typical hand sprayer, paint brush or paint roller.

Without being bound by theory, it is presumed that the composition of the present invention functions effectively because the tricalcium phosphate reacts with lead to form immobilized, water insoluble lead compounds that have low solubility in acidic conditions, such as upon exposure to the stomach acids of humans or other animals. Further, in the presence of chloride, the TCP is believed to form chloropyromorphite, which is highly stable even in low pH and will not dissolve appreciably in the human digestive system. The composition of the present invention thus provides less risk from inadvertent ingestion of remediated dusts.

It is understood that, in light of a reading of the foregoing description and drawings, those with ordinary skill in the art will be able to make changes and modifications to the present invention without departing from the spirit or scope of the invention, as defined herein. For example, those skilled in the art may.

What is claimed is:

1. A composition for heavy metal remediation, said composition comprising:
   a) a phosphate compound, selected from the group consisting of tricalcium phosphate, hydroxyapatite, dicalcium phosphate, dicalcium phosphate dihydrate and combinations thereof, wherein said phosphate compound is maintained at a diameter of less than or equal to 0.006 inches in said composition;
b) at least one surfactant;
c) a primary thixotrope selected from a hydrophobically-modified hydroxyethylcellulose at a concentration of from 0.2 wt % to 0.9 wt % of the composition;
d) a chloride source; and
e) water.

2. The composition of claim 1 wherein said phosphate compound is at least one phosphate compound selected from the group consisting of tricalcium phosphate, hydroxyapatite, dicalcium phosphate, dicalcium phosphate dihydrate and combinations thereof.

3. The composition of claim 1, further comprising a secondary thixotrope selected from the group consisting of methyl oxirane polymer, colloidal aluminum silicate, kaolinite clay, bentonite clay, attapulgite clay and combinations thereof at a concentration of from 0.2 wt % to 0.9 wt % of the composition, and an associative thickener at a concentration of 0.2 wt % to 10 wt % of the composition.

4. The composition of claim 1, wherein said chloride source is a water soluble chloride source selected from the group consisting of sodium chloride, calcium chloride, magnesium chloride, and iron chloride.

5. The composition of claim 1, wherein at least one surfactant is a phosphate ester salt.

6. The composition of claim 5, wherein said at least one surfactant further comprises an ethoxylated nonylphenol.

7. The composition of claim 1, further comprising a binder.

8. The composition of claim 1, further comprising a dispersant, a defoamer, or a combination thereof.

9. The composition of claim 1 further comprising an antimicrobial preservative, a colorant, or a combination thereof.

10. A composition for heavy metal remediation, said composition comprising:
a) a phosphate compound, selected from the group consisting of tricalcium phosphate, hydroxyapatite, dicalcium phosphate, dicalcium phosphate dihydrate and combinations thereof;
b) at least one surfactant;
c) a thixotrope mixture comprising
i) hydrophobically-modified hydroxyethylcellulose at a concentration of from 0.2 wt % to 0.9 wt % of the composition;
ii) a secondary thixotrope, selected from the group consisting of methyl oxirane polymer, colloidal aluminum silicate, kaolinite clay, bentonite clay, attapulgite clay and combinations thereof, said secondary thixotrope present at a concentration of from 0.2 wt % to 0.9 wt % of the composition; and
iii) an associative thickener, present at a concentration of 0.2 wt % to 10 wt % of the composition;
d) a chloride source; and
e) water,
wherein said thixotrope mixture is selected to provide said composition with a rest viscosity value of from 60 Krebs units to 110 Krebs units.

11. The composition of claim 10, wherein said chloride source is a water soluble chloride source selected from the group consisting of sodium chloride, calcium chloride, magnesium chloride, and iron chloride.

12. The composition of claim 10, wherein at least one surfactant is a phosphate ester salt.

13. The composition of claim 12, wherein said at least one surfactant further comprises an ethoxylated nonylphenol.

14. The composition of claim 10, further comprising a binder.

15. The composition of claim 10, further comprising a dispersant, a defoamer, and an antimicrobial preservative.

16. A composition for heavy metal remediation, said composition consisting essentially of:
a) a phosphate compound, selected from the group consisting of tricalcium phosphate, hydroxyapatite, dicalcium phosphate, dicalcium phosphate dihydrate and combinations thereof;
b) at least one phosphate ester salt surfactant;
c) a thixotrope mixture comprising
i) hydrophobically-modified hydroxyethylcellulose at a concentration of from 0.2 wt % to 0.9 wt % of the composition;
ii) a secondary thixotrope, selected from the group consisting of methyl oxirane polymer, colloidal aluminum silicate, kaolinite clay, bentonite clay, attapulgite clay and combinations thereof, said secondary thixotrope present at a concentration of from 0.2 wt % to 0.9 wt % of the composition; and
iii) an associative thickener, present at a concentration of 0.2 wt % to 10 wt % of the composition;
d) a chloride source selected from the group consisting of sodium chloride, calcium chloride, magnesium chloride, and iron chloride;
e) a binder;
f) a dispersant;
g) a defoamer; and
h) water,
wherein said thixotrope mixture is selected to provide said composition with a rest viscosity value of from 60 Krebs units to 110 Krebs units.

17. The composition of claim 16 further comprising an antimicrobial preservative.

18. The composition of claim 16 further comprising a colorant.

19. A method for the remediation of heavy metals, said method comprising:
a) identifying a material containing a measurable concentration of heavy metal contamination;
b) applying a composition to the heavy-metal containing material;
c) allowing the composition to react with the heavy-metal containing material for a predetermined period of time;
c) measuring the concentration of heavy metal contamination after treatment with the composition;
d) determining the concentration of heavy metal contamination relative to a predetermined threshold, and if the concentration is greater than the predetermined threshold repeating the method starting at step b); and,
e) terminating the method when the heavy metal contamination is equal to or lower than the predetermined threshold,
wherein the composition of step b) comprises:
1) a phosphate compound, selected from the group consisting of tricalcium phosphate, hydroxyapatite, dicalcium phosphate, dicalcium phosphate dihydrate and combinations thereof;
2) at least one surfactant;
3) a thixotrope mixture comprising
i) hydrophobically-modified hydroxyethylcellulose;
ii) a secondary thixotrope, selected from the group consisting of methyl oxirane polymer, colloidal aluminum silicate, kaolinite clay, bentonite clay, attapulgite clay and combinations thereof; and
iii) an associative thickener;

4) a chloride source selected from the group consisting of sodium chloride, calcium chloride, magnesium chloride, and iron chloride; and 5) water.

* * * * *